May 7, 1968     W. T. ESCUE     3,382,433

SELF-BALANCING SERVOMOTOR OPERATED AUTOMATIC CALIBRATOR

Filed Nov. 19, 1963

William T. Escue,
*INVENTOR.*

3,382,433
SELF-BALANCING SERVOMOTOR OPERATED AUTOMATIC CALIBRATOR
William T. Escue, Huntsville, Ala., assignor to the United States of America as represented by the Secretary of the Army
Filed Nov. 19, 1963, Ser. No. 324,895
6 Claims. (Cl. 324—63)

The invention described herein may be manufactured and used by or for the Government for governmental purposes without the payment of any royalty thereon.

This invention relates generally to a calibrating system and more particularly to an automatic calibrator for calibrating potentiometric pressure transducers and potentiometers.

The need for accurately calibrating potentiometric pressure transducers and potentiometers has long been present, however, the present instruments do this calibration by manually adjusting a means on a calibrator until a null is read on a meter. These manual adjustments take an appreciable amount of time when a large number of potentiometers are to be calibrated. Further, the manual adjustment increases the chance of human error.

According to the present invention the automatic calibrator's primary function is to furnish an excitation voltage to any output potentiometer that requires calibration and by a null-balance system to determine percentage of output vs. excitation voltage. The invention uses an amplifier to drive a servomotor to a null. The motor drives a digital readout dial which tells the percentage of full scale voltage across the calibrator's potentiometer.

Accordingly, it is an object of the present invention to provide a calibrator suitable for use in calibrating potentiometers.

A further object of the present invention is to provide a driving means in the calibrator so as to make the calibrator automatic.

A still further object is to provide a suitable control circuit for the driving means.

These and other objects and advantages of the present invention will become apparent from the following detailed description and from the accompanying drawings, in which.

Figure 1:
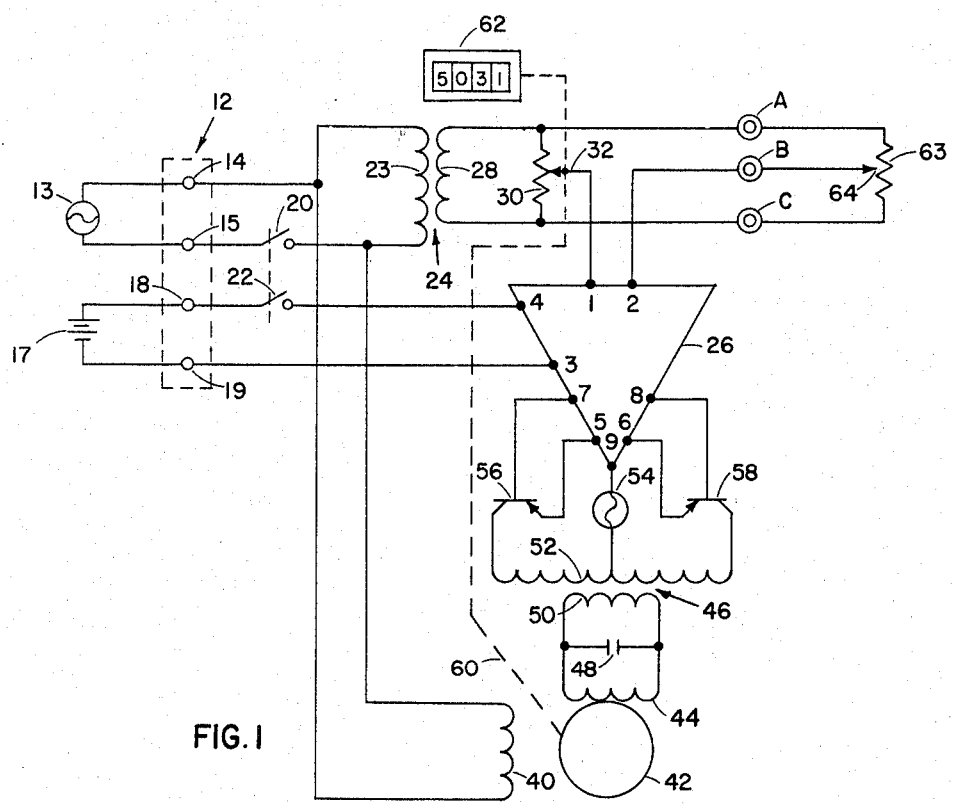
FIGURE 1 is a schematic circuit diagram according to the invention.

A preferred embodiment of the invention is illustrated in FIGURE 1 and comprises a terminal board 12 having terminals 14, 15, 18 and 19. An A.C. source 13 is connected to terminals 14 and 15 and a D.C. source of voltage, such as battery 17, is connected to terminals 18 and 19. Switches 20 and 22 are provided for connecting the A.C. source and the D.C. source to a primary winding 23 of transformer 24 and to terminals 3 and 4 of amplifier 26 respectively. Secondary winding 28 of transformer 24 is connected across potentiometer 30 and to output terminals A and C. A sliding arm 32 of potentiometer 30 is connected to terminal 1 of amplifier 26. A further output terminal B is connected to terminal 2 of the amplifier.

Switch 20 further connects the A.C. source of winding 40 to servomotor 42. Winding 44 of servomotor 42 is supplied by transformer 46. Transformer 46 has a capacitor 48 connected in parallel with its secondary winding 50. The primary winding 52 is a center tapped winding. A ¾ ampere fuse 54 is connected between the center tap and terminal 9 of amplifier 26. One end of the primary winding 52 is connected to a collector electrode of transistor 56, while the other end is connected to a collector electrode of transistor 58. Emitter electrodes of transistors 56 and 58 are connected to terminals 5 and 6 of the amplifier 26. Terminals 7 and 8 of the amplifier are connected to base electrodes of transistors 56 and 58 respectively.

The servomotor drives a shaft 60 which positions slider arm 32 of potentiometer 30 to a null position. Shaft 60 also drives a digital readout meter 62 which indicates the position of slider arm 32.

Potentiometer 63 of a potentiometric pressure transducer to be calibrated is connected across output terminals A and C. The slider arm 64 is connected to output terminal B. Therefore, a bridge network is formed by potentiometers 30 and 63 having an input across terminals A and C, and an output across terminal B and slider arm 32. The output of the bridge is adjusted to a null by servomotor 42, shaft 60 and slider arm 32 of potentiometer 30.

To calibrate potentiometer 63, slider arm 64 is set at the top (as viewed in FIGURE 1) which should be the 100% voltage position, and the scale is marked according to the reading on meter 62. Other readings are taken at different positions on potentiometer 63 and are marked in the same way. Potentiometer 63 may be recalibrated by setting slider arm 64 on its scale at some value (50% in FIGURE 1 of the drawing) and checking this value against the reading of meter 62 (50.31%).

Figure 2:
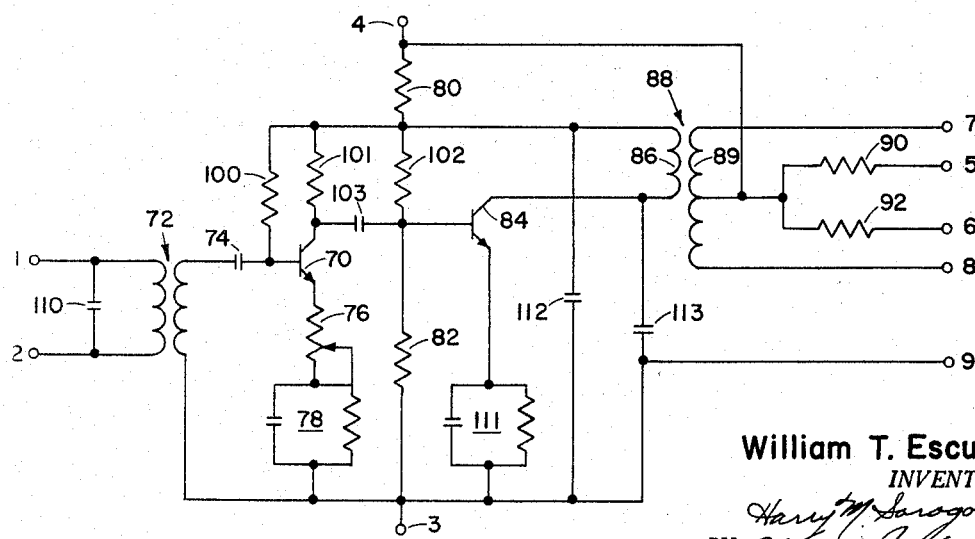
FIGURE 2 is a schematic circuit diagram of a preferred embodiment of the amplifier shown in block form in FIGURE 1.

When slider arm 64 is changed, a voltage difference is developed between slider arm 32 and slider arm 64. This voltage is supplied to input terminals 1 and 2 of amplifier 26 as an error voltage. In FIGURE 2 the error voltage at input terminals 1 and 2 is applied across the base and emitter circuit of transistor 70 by way of transformer 72, capacitor 74, resistor 76 and filter 78. When transistor 70 is conducting the voltage drop across resistor 80 becomes greater; therefore the voltage across resistor 82 and base-emitter input circuit to transistor 84 becomes less. This will cause transistor 84 to cut off and open the circuit to primary winding 86 of transformer 88, thus causing a voltage to be generated across secondary winding 89. The voltage across center tapped secondary winding 89 is connected to the input circuits of transistors 56 and 58 by way of amplifier terminals 5, 6, 7, and 8, and resistors 90 and 92.

The primary winding 52 of transformer 46 is supplied by the D.C. source through terminal 9, fuse 54 and transistors 56 and 58; therefore, the voltage across secondary winding 46 and across motor winding 44 will be equal in phase and frequency to the input voltage but amplified in voltage. With current flowing in motor winding 44, the motor 42 rotates shaft 60 and causes slider arm 32 to move up or down according to the phase of the current. This will cause slider arm to reach a null position and thus reduce the input voltage to terminals 1 and 2 to zero. With zero input the output of the amplifier drops to zero, therefore stopping the current flow in winding 44 of the servomotor and stopping shaft 60. Shaft 60 is also connected to digital readout meter 62 which indicates the position of slider arm 32 in percentages.

Resistors 100, 101, and 102 and capacitor 103 are provided for the purpose of providing a proper bias for the transistors. Capacitors 110, 112, and 113 are in the circuit to act as filter elements. Filter elements 78 and 111 prevent undesirable transients from developing in the system.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claims

I claim:

1. An automatic calibrator comprising an A.C. voltage source, a first potentiometer, and a second potentiometer all connected in parallel with each other; said first and second potentiometers having first and second slider arms respectively; an amplifier having first and second input terminals, and first, second, third, fourth, and fifth output terminals; said first input terminal being connected to said first slider arm, and said second input terminal being connected to said second slider arm; a first transistor having first emitter, base and collector electrodes; a second transistor having second emitter, base and collector electrodes; said first output terminal of said amplifier being connected to the first emitter electrode, the second output terminal being connected to said first base electrode, said third output terminal being connected to said second emitter electrode, and the fourth output terminal of said amplifier being connected to the second base electrode; a transformer having a center tapped primary winding and a secondary winding; one end of said primary winding being connected to said first collector electrode, the other end of said primary winding being connected to said second collector electrode; a fuse; one end of said fuse being connected to said fifth output terminal of said amplifier, the other end of said fuse being connected to the center tap on said primary winding of the transformer; a servometer having first and second windings; said first winding being connected in parallel with said secondary winding, said second winding being connected directly across said A.C. voltage source; a shaft means driven by said servomotor; a digital readout meter; said shaft means driving both the first slider arm of said first potentiometer and said digital readout meter; said digital readout meter indicating the position of said first slider arm along said first potentiometer from zero to one hundred percent; and a D.C. source of voltage connected to said amplifier for supplying power thereto.

2. A calibrator comprising a source of A.C. voltage: a first voltage divider means connected across said source of A.C. voltage, said first voltage divider means being a potentiometer having an adjustable slider arm; a second voltage divider means connected in parallel with said first voltage divider means, said second voltage divider means being a potentiometric adjustable voltage divider and having a slider arm moveable over the entire length of said voltage divider for calibration; an amplifier having first and second input terminals and at least two output terminals, an electrical lead directly connecting said first input terminal to said slider arm of said first voltage divider and an electrical lead directly connecting said second input terminal to said slider arm of said second voltage divider; a digital indicator means; and a driving means, said driving means including a servomotor having first and second windings, means directly connecting said A.C. voltage to said first winding, means connecting said second winding to said outputs of said amplifier for supplying electrical energy to said second winding, means mechanically connecting said driving means to said adjustable slider arm of said first voltage divider means for positioning said adjustable arm of said first divider means to a point such that there is no voltage difference to the input terminals of the amplifier irrespective of the position to which said slider arm of said second voltage divider means has been adjusted and to said digital indicator means for indicating the position of the slider arm of said first voltage divider means, which position corresponds to the position of said second voltage divider means, said digital indicator means thereby being utilized for calibrating said second voltage divider means.

3. A calibrator as set forth in claim 2, wherein said second voltage divider means constitutes a load to be calibrated.

4. A calibrator as set forth in claim 3, wherein said amplifier consists of a source of D.C. voltage; said second winding of the servomotor being connected across said source of D.C. voltage through said amplifier; a first resistor connected in series with the source of D.C. voltage and said second windings; a first transistor having an emitter, collector, and base electrodes; said emitter and collector electrodes being connected in series with the source of D.C. voltage, second winding, and said first resistor; a second transistor having an emitter, collector, and base electrodes; said emitter and collector electrodes being connected across said source of D.C. voltage through said first resistor; a third voltage divider having end terminals connected in parallel with said second transistor's emitter and collector electrodes; the base and emitter electrodes of said second transistor constituting the input terminals of said amplifier; and a connection from a middle terminal of said third voltage divider to the base electrode of said first transistor.

5. An amplifier comprising in combination a source of D.C. voltage; a load circuit, said load circuit comprising a first transformer having a primary coil connected across said D.C. voltage source, a secondary winding of said first transformer having a center tap, said center tap connected to a positive terminal of said D.C. voltage source; a first resistor, said first resistor being connected in series with said D.C. voltage source and said primary coil; a first transistor having emitter, collector and base electrodes; said emitter and collector electrodes being connected in series with said D.C. voltage source, load circuit, and said first resistor; a second transistor having emitter, collector and base electrodes, said emitter and collector electrodes being connected in parallel with said D.C. voltage source and said first resistor; a voltage divider having end terminals and a middle terminal, said end terminals being connected in parallel with said second transistor's emitter and collector electrodes; a source of error voltages connected across the base and emitter electrodes of said second transistor; a connection from said middle terminal of said voltage divider to the base electrode of said first transistor; a third transistor having emitter, collector and base electrodes; a fourth transistor having emitter, collector and base electrodes, said center tapped secondary winding of said first transformer being further connected to said emitters of said third and fourth transistors, one end of said secondary winding of said first transformer being connected to said base electrode of said third transistor, a second end of said secondary winding of said first transformer being connected to said base electrode of said fourth transistor; a second transformer having a center primary winding; a fuse; a negative terminal of said D.C. voltage source connected to said center tap of said primary winding of said second transformer through said fuse, one end of said primary winding of said second transformer connected to said collector electrode of said third transistor, a second end of said primary winding of said second transformer connected to said collector electrode of said fourth transistor, and a secondary winding of said second transformer connected in parallel with a field winding of a servo motor for controlling current flow in said field winding.

6. An amplifier as set forth in claim 5 wherein said amplifier further includes said D.C. voltage source having first and second terminals, said first terminal having positive voltage applied thereto and said second terminal having negative voltage applied thereto; a second resistor, said second resistor connected between the collector of said second transistor and said first terminal of said voltage source through said first resistor a capacitor, said capacitor being connected between said middle terminal of said voltage divider and the collector of said second transistor; and a third resistor connected between said first terminal of said voltage source through said first resistor and the base electrode of said second transistor.

References Cited

UNITED STATES PATENTS

| | | | |
|---|---|---|---|
| 2,628,332 | 2/1953 | Richardson | 318—28 |
| 2,611,812 | 9/1952 | Hornfeck | 324—99 X |
| 2,715,208 | 8/1955 | Hayes | 324—63 |
| 2,728,039 | 12/1955 | Dueringer | 318—29 X |
| 2,832,924 | 4/1958 | Cilyo | 318—448 X |

FOREIGN PATENTS 530,588   9/1956   Canada.

RUDOLPH V. ROLINEC, *Primary Examiner.*

E. E. KUBASIEWICZ, *Assistant Examiner.*